(12) United States Patent
Devereaux

(10) Patent No.: US 8,146,984 B2
(45) Date of Patent: Apr. 3, 2012

(54) PROTECTIVE VEHICLE COVER

(76) Inventor: Carey Devereaux, Fort Worth, TX (US)

( * ) Notice: Subject to any disclaimer, the term of this patent is extended or adjusted under 35 U.S.C. 154(b) by 20 days.

(21) Appl. No.: 12/859,385

(22) Filed: Aug. 19, 2010

(65) Prior Publication Data

US 2011/0140478 A1   Jun. 16, 2011

Related U.S. Application Data

(60) Provisional application No. 61/286,466, filed on Dec. 15, 2009.

(51) Int. Cl.
*B60J 11/04* (2006.01)

(52) U.S. Cl. .......... 296/136.02; 296/136.07; 296/136.1; 150/166

(58) Field of Classification Search ............. 296/136.02, 296/136.07, 136.1, 136.11; 150/166
See application file for complete search history.

(56) References Cited

U.S. PATENT DOCUMENTS

| | | | |
|---|---|---|---|
| 3,665,355 A * | 5/1972 | Sasaki et al. | 335/306 |
| 4,635,996 A * | 1/1987 | Hirose | 296/136.07 |
| 4,734,312 A | 3/1988 | Sugiyama | |
| 4,807,922 A | 2/1989 | Glover | |
| 5,653,492 A | 8/1997 | Mills | |
| 5,738,403 A * | 4/1998 | Tyson | 296/136.02 |
| 5,800,006 A | 9/1998 | Pettigrew | |
| 5,820,201 A * | 10/1998 | Jabalee | 296/136.02 |
| 5,845,958 A * | 12/1998 | Rudys et al. | 296/136.08 |
| 6,017,079 A * | 1/2000 | Warner | 296/136.07 |
| 6,070,629 A | 6/2000 | Whiteside | |
| 6,220,648 B1 * | 4/2001 | Daniel | 296/136.02 |
| 6,491,335 B1 * | 12/2002 | Cohill | 296/136.07 |
| 6,517,141 B1 * | 2/2003 | Su | 296/136.1 |
| 6,893,074 B1 | 5/2005 | Wilson | |
| 7,036,867 B1 * | 5/2006 | Yang | 296/136.07 |
| 7,100,965 B1 * | 9/2006 | Stover | 296/136.07 |
| 7,182,391 B2 * | 2/2007 | Thrasher et al. | 296/136.02 |
| 7,677,637 B2 * | 3/2010 | Aydar et al. | 296/136.07 |
| 7,699,380 B2 * | 4/2010 | Coleman | 296/136.02 |
| 7,913,457 B1 * | 3/2011 | Orr | 52/2.23 |
| 2007/0085372 A1 * | 4/2007 | Dhanray | 296/136.07 |
| 2008/0174144 A1 | 7/2008 | Coleman | |
| 2010/0007169 A1 * | 1/2010 | Nguyen | 296/136.07 |

FOREIGN PATENT DOCUMENTS

EP   0768202 A1   4/1997

* cited by examiner

*Primary Examiner* — Jason S Morrow
(74) *Attorney, Agent, or Firm* — Charles D. Gunter, Jr.

(57) ABSTRACT

A protective vehicle cover is shown for protecting an outer surface of a vehicle from hail and other falling objects. The cover includes a flexible blanket having a front side, a back side and a thickness therebetween. The blanket is made up of an outer fabric cover and a protective central region, the protective central region being made up of a layer of foam cushioning material covered with a layer of flexible plastic-type material which together provide a cushioning effect to protect the outer surface of the vehicle from hail and other falling objects; Fastening elements are provided for attaching the flexible blanket to the outer surface of the vehicle.

13 Claims, 2 Drawing Sheets

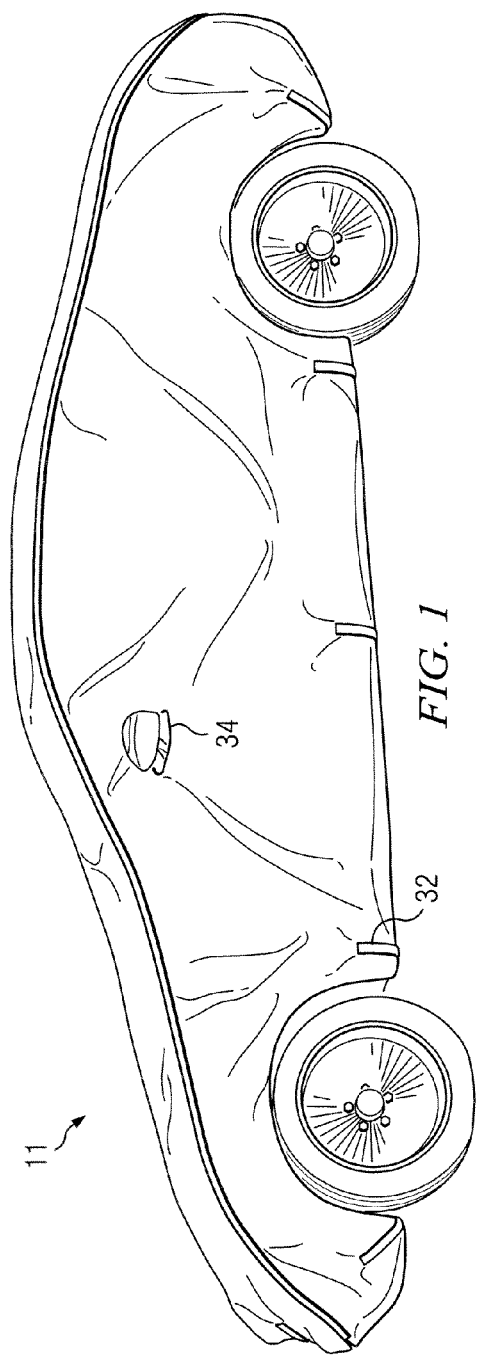
FIG. 1
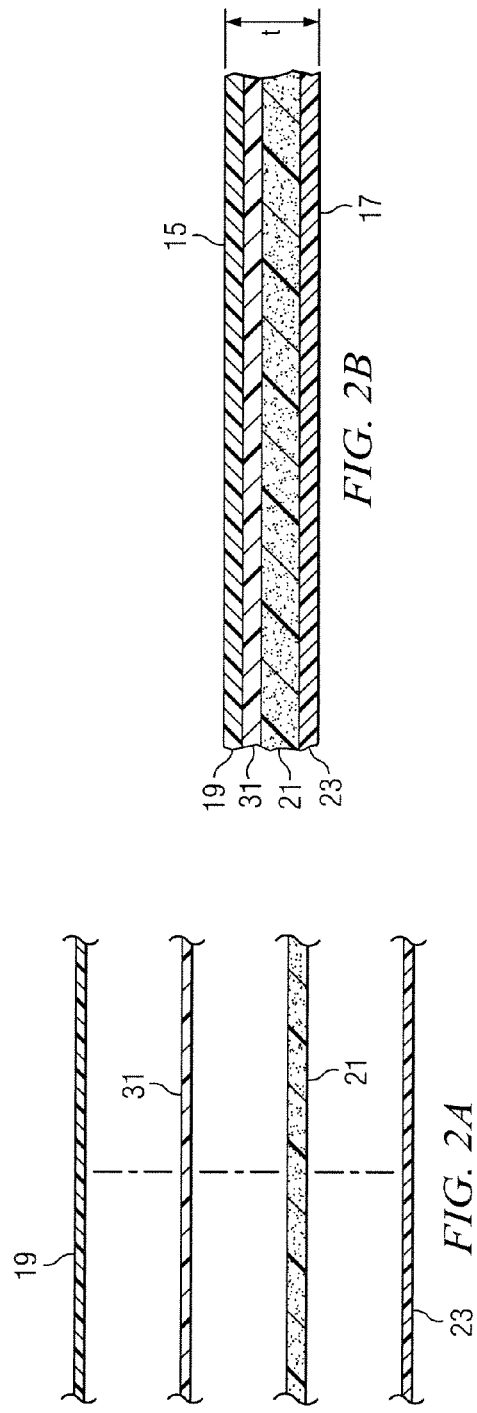
FIG. 2A
FIG. 2B

PROTECTIVE VEHICLE COVER

CROSS-REFERENCE TO RELATED APPLICATIONS

The present case claims priority from an earlier filed Provisional Application Ser. No. 61/286,466, filed Dec. 15, 2009, entitled "Vehicle Protective Cover," by the same inventor.

BACKGROUND OF THE INVENTION

1. Field of the Invention

The present invention relates generally to vehicle covers which can be temporarily installed on an outer surface of the vehicle for protecting the vehicle from hail, falling objects, or other types of exterior impact damage, as well as from the normally deleterious effects of sunlight and environmental aging.

2. Description of the Prior Art

Automobile and other types of vehicles suffer damage each year in the form of hail and other types of exterior impact damage. At least about half of the continental United States, from the rocky mountains to the east coast is affected by hail each year. Roughly a seven state area in the midwest and southwestern United States is particularly susceptible to hail damage. Several areas in Texas have experienced hail damage in the millions of dollars in recent years. Damage to uncovered vehicles has caused insurance rates to skyrocket. In addition to individual automobiles which have been damaged, automobile dealerships typically have no way to protect new car inventory and usually resort to selling damaged vehicles at a discounted price.

A variety of protective car "covers" are known in the prior art. Many of these covers are intended merely to protect the vehicle from typical outdoor weather conditions including sun, rain, snow, ice or the like, but are not specifically designed to protect from falling objects and impact strikes such as is caused by hail. The covers which have specifically been designed for hail protection tend to fall into two basic types. These have been described as the impact barrier method and the impact adsorbing method.

The impact barrier method of hail protection uses a cover with an accompanying space or distance between the vehicle surface and the protective cover. These type devices tend to be bulky and complicated and, in some cases, uneconomical to manufacture.

The impact absorbing methods utilize a material or a combination of materials which cover the exposed surfaces of the vehicle and which generally lie in contact with the vehicle surface. These coverings range from bubble-wrap type materials to covers which incorporate rigid plates. While these devices may work quite effectively for the vehicle in some respects, they also tend to have the disadvantages of portability and expense.

The following references were located on a prior art search and are intended to be representative of the state of the art:

| Pat. No. | Inventor | Issue Date |
|---|---|---|
| 4,807,922 | Glover | Feb. 28, 1989 |
| 4,734,312 | Sugiyama | Mar. 29, 1988 |
| 5,738,403 | Tyson | Apr. 14, 1998 |
| 5,800,006 | Pettigrew | Sep. 1, 1998 |
| 6,893,074 | Wilson | May 17, 2005 |

-continued

| Publ. No. | Inventor | Publ. Date |
|---|---|---|
| 2008/0174144 | Coleman | Jul. 24, 2008 |

European Patent Application No. EP 0768202.

The '922 patent shows an impact car cover which includes an outer plastic-like flexible layer, a padded central laminate and an inner laminate of a vinyl-like material. The reference uses very general terminology in describing the inner layer as being "again of a vinyl-like material" (column 4, lines 38-40).

The '312 patent uses an outer thin plastic layer and an elastic foamed plastic inner layer.

The '403 patent teaches the use of an outer layer of water resistant nylon or polyester, a center layer of closed cell polyurethane foam and an inner layer of woven nylon or polyester.

The '006 patent teaches a top layer and bottom layer of a flexible vinyl-like polymeric material.

The '074 patent teaches a top layer of chamois leather or suede, a mid-layer of non-memory foam rubber and an inner most layer of neoprene rubber. This design includes the use of panels of covering material, but the panels are intended to be used in place on the vehicle while the vehicle is in motion.

The '144 publication teaches the use of a high tensile strength polymer layer surrounded by inner and outer metallic layers.

The EP '202 publication again teaches the use of sectors of material but they are made up of tarpaulin and padding material.

While these prior art covers may have provided some degree of minimal protection, they were not sufficient to protect from large diameter hail or were deficient in some other major regard. For example, certain of the covers were so bulky that they required substantial storage space when not in use. Because of their bulk, they could not easily be rolled up and transported in the trunk or other compartment of the vehicle. Certain of the prior art covers using bubble wrap type plies were one time use only devices, since the bubble wrap would be punctured by falling hail.

Thus, despite the advances represented by the art discussed above, there has continued to be lacking a car protective covering that is of a construction expressly intended for the purpose of protecting the car from high impact incidents and yet which is economical to produce and which is made of a pliable and flexible materials which facilitate the storage of the device.

SUMMARY OF THE INVENTION

The present invention has as its object to provide a protective vehicle cover that effectively protects a vehicle from hail and other falling objects and which is easily installed, removed and is compact enough to be stored in the trunk of the vehicle.

Another object of the invention is to provide a protective vehicle cover which is lightweight, compact and yet which is of a durable and reliable construction while maintaining acceptable storage capabilities.

Another object of the invention is to provide a protective vehicle cover comprised of multiple plies of material which are adequate to form a cushion to protect against hail, freezing rain and other types of falling objects.

Another object of the invention is to provide a protective vehicle cover which is simple to deploy and which includes fastening elements which assist a user in installing the cover, even in windy conditions.

It is another object of the present invention to provide a new and improved impact car cover which is simple in design and economical to manufacture.

The protective vehicle cover of the invention is used to cover the outer surface of the vehicle having a hood, a roof, a trunk and side door panels with mirrors to provide protection from hail and other falling objects. The cover comprises a flexible blanket having a front side and a back side with a thickness therebetween. The blanket is made up of an outer fabric cover and a protective central region, the protective central region being made up of a layer of foam cushioning material covered with a layer of flexible plastic-type material, most preferably a flexible vinyl film sheet, which together provide a cushioning effect to protect the outer surface of the vehicle from hail and other falling objects. A plurality of fastening elements are associated with the blanket for attaching the flexible blanket to the outer surface of the vehicle.

In one preferred form of the protective vehicle cover of the invention, the outer cover of the flexible blanket is formed from a material selected from the group consisting of nylons, polyesters, vinyl plastics and polyolefins. For example, the outer cover can be formed of a woven nylon fabric material or from a spun-bonded polypropylene material. The layer of foam cushioning material which makes up the protective central region of the blanket can be made of a closed cell polyethylene foam material. The most preferred material for the layer of flexible plastic-type material which covers the layer of foam cushioning material is formed from a PVC flexible shower pan liner material. The layer of flexible plastic-type material has a thickness from about 30 to 40 mils.

The fastening elements which are used to secure the cover to the vehicle can include Velcro™ seams which are used to join the respective panels of the cover together, where the cover is provided in multiple pieces. In one preferred form of the invention, the flexible blanket is provided as a plurality of separate panels, each of which is custom fit to a portion of the exterior of the vehicle to be protected. The plurality of separate panels can each be provided with seam regions, the seam regions being connectable by means of Velcro™, or by means of zippers or other convenient fasteners.

Additional objects, features and advantages will be apparent in the written description which follows.

BRIEF DESCRIPTION OF THE DRAWINGS

FIG. 1 is a side perspective view of an automobile having one of the protective vehicle covers of the invention installed thereon.

FIG. 2A is a close up cross-sectional view of a portion of the vehicle cover of FIG. 1 which shows the various plies of the material in exploded fashion for ease of illustration.

FIG. 2B is a cross-sectional view of the vehicle cover of FIG. 1 showing the laminated plies of the material in somewhat exaggerated fashion for ease of viewing.

DETAILED DESCRIPTION OF THE INVENTION

Figures 3, 4, 5:
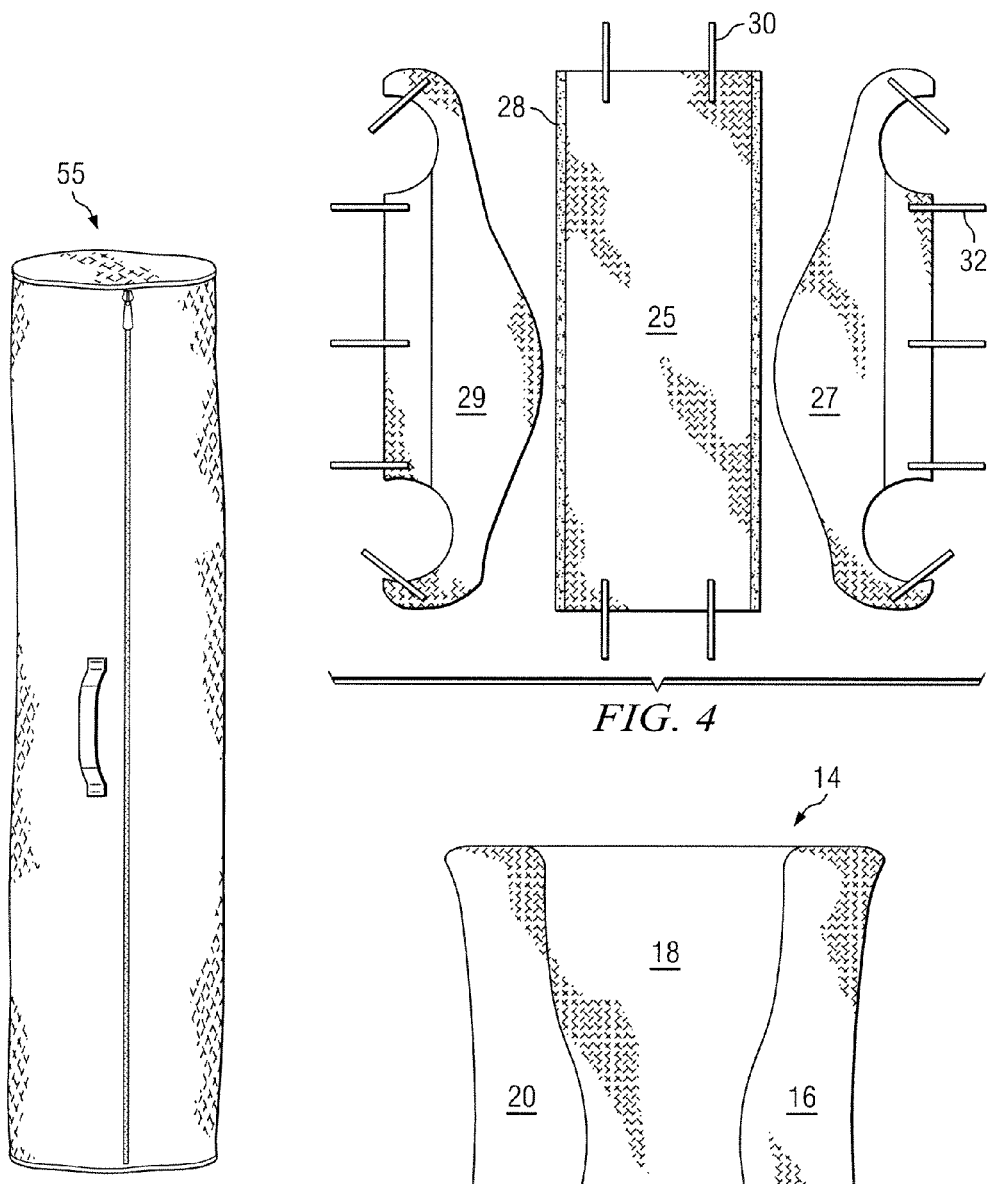
FIG. 3 is a perspective view of the vehicle cover of the invention rolled up and stored in a carrying case.
FIG. 4 is a planar view of the various panels which make up the protective vehicle cover of the invention where the panels are custom fit to a particular make and model or vehicle.
FIG. 5 is a view similar to FIG. 4, but showing a single piece, generic version of the vehicle cover of the invention.

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

With reference now to the drawings, and in particular to FIG. 1 thereof, a new and improved impact car cover embodying the principles and concepts of the present invention and generally designated by the reference numeral 11 will be described. The protective cover 11 is formed as a flexible blanket which is intended to provide protection for a vehicle, such as the automobile 13, having a hood, roof and trunk from hail and other falling objects. As can been seen in FIG. 2B, the blanket has a front side 15, a back side 17 and a thickness "t".

As best seen in the detail cross sections of FIGS. 2A and 2B, the flexible blanket includes an outer ply in the form of an outer fabric cover 19. There is also a protective central region made up of plies 21 and 31. Finally, there is an inner ply 23 which is, in effect, a continuation of the outer fabric cover 19. FIG. 2A shows the various plies of the blanket separated and in exploded fashion for ease of illustration. Note that the central region of the blanket includes both a padded foam layer 21 and a layer of flexible plastic-type material 31 which covers the top or outer surface of the padded foam layer 21. Together these materials provide a cushioning effect to protect the outer surface of the vehicle from hail and other falling objects. The inner ply 23 is positionable against the outer surface of the vehicle and substantially conforms to the shape of the vehicle. The front side 15 of the protective blanket is exposed to the weather.

The flexible blanket of the invention is selectively sized to cover at least the hood, roof and trunk surfaces of the vehicle. Preferably, the protective cover also provides some protection to the side panels of the vehicle, as well. In the case of the protective vehicle cover of the invention illustrated in FIG. 4, the protective blanket is provided in three panels; a top panel 25 and two matching side panels 27, 29 which substantially cover the exposed surfaces of the vehicle. In this version of the protective cover of the invention, the series of panels are actually "custom fit" for a particular model of automobile or other vehicle. The panels 25, 27 and 29 are preferably connected to each other by means of hook and loop type fastening regions, such as the Velcro™ seams shown in the drawings (e.g., seam 28 in FIG. 4). Alternatively, some other type of connector, such as, for example, zipper regions could be provided which would run along the seams of each of the panels.

Each of the panels will also include some type of fastening or tie down elements for attaching the panels to the exterior of the vehicle. These fastening elements can be any convenient element which will secure the cover to the vehicle without damaging the paint or exterior trim of the vehicle. For example, the fastening or tie down elements can be selected from among tie down straps, mating Velcro™ patches, suction cups and magnets. As shown in FIGS. 4 and 5, the preferred fastening elements are tie down straps (for example straps 30, 32). The tie down straps 30, 32 can be provided with Velcro™ attachment regions at the outer extents thereof which may, for example, pass under the vehicle body to tighten the cover down in high wind conditions. The secured tie down straps are also illustrated in FIG. 1, for example at 32. FIG. 1 also shows a small opening or slit in the cover at 34 for receiving the automobile mirror. The presence of the mirror also helps to secure the cover in position.

FIG. 5 shows another more "generic" version of the cover of the invention which is basically a "one fits all" version of the cover. The cover has a top region 18 and side panel regions 16, 20 are integrally formed in either one piece or separate pieces which have been sewn or otherwise affixed. With reference again to FIGS. 2A and 2B of the drawings, a particularly preferred form of the protective cover of the invention is illustrated. While the drawings show a preferred form of the invention, it will be understood that variations in the design are possible, such as the addition of additional plies of material. The essential elements of the cover are illustrated in the drawings. With this in mind, the outer fabric cover or ply (19 in FIG. 2A) of the flexible blanket 11 can be formed of any of a number of synthetic flexible materials having the characteristics of relative impermeability to moisture and deterioration upon exposure to direct sunlight. It is preferably formed from a material selected from the group consisting of polyesters, nylons, vinyl plastics and polyolefins. One preferred material for the outer fabric cover is a woven nylon fabric material such as the commercially available material SURLAST™ provided by Glen Raven, a 600×600 denier 100% solution dyed polyester material. This material is a woven nylon having a weight of 7 oz per yard, a break strength of warp 325 lbs; fill 275 lbs, a tear strength warp 40 lbs; fill 35 lbs, having high UV and mildew resistance. The material is water resistant and has excellent tear and abrasion resistance. By "solution dyed" is meant that the colors, UV inhibitors and stabilizers are added while the fabric is in the liquid state. A urethane coating is applied to the finished fabric to add stability to the weave, increase water and mildew resistance and to eliminate shrinkage and stretching.

Another preferred material for the outer ply fabric cover 19 is a spun-bonded polypropylene material. The preferred material selected for the outer ply 19 can be either a natural or synthetic fiber weave, but synthetic fibers are preferred.

As has been briefly mentioned, the protective central region of the flexible blanket 11 is made up of a layer of foam cushioning material 21 covered with a layer of flexible plastic-type material 31. The padded foam material which is used for the central region of the blanket can be any of a number of commercially available padded foam materials, such as a foamed polyolefin or foamed polyurethane material that possesses characteristic resiliency of this class of material. One preferred material is a commercially available 2.2 lb. density closed cell polyethylene foam material.

While the materials which have been described for the outer layers and inner padded layer are conventional materials, they do not, in and of themselves, possess the necessary structural integrity to provide a vehicle with protection from falling hail. It was necessary to provide an additional layer of high strength, and yet having the necessary properties of plasticity, flexibility and endurance which layer did not add undue bulk to the overall construction of the cover. After a great deal of testing, one class of material was located which possessed the required characteristics to meet the foregoing requirements.

The layer of flexible plastic type material 31 which covers the central region of padded foam 21 is preferably formed from polyvinyl chloride (PVC) or chlorinated polyethylene (CPE) flexible shower pan liner material. One preferred material is commercially available as the Oatey PVC Shower Pan Liner™ in either a 30 or 40 mil thickness. This type of shower pan liner was developed to replace lead, copper and similar materials for lining shower stalls, saunas, floor drains, or sunken tubs. It is described in the literature as a "flexible vinyl film" sheet material.

Another commercially available material of the same general class is the SuperiorBilt™ vinyl shower pan liner available from Custom Building Products of Seal Beach, Calif. It is described in the literature as a "vinyl shower pan liner, a sheet membrane manufactured from polyvinyl chloride, with a nominal thickness of 1.0 mm (0.40 inch)."

The technical data values for the commercially available SuperBilt™ vinyl shower pan liner are given in Table I which follows:

TABLE I

| Test Method | | Specification | Test Value |
|---|---|---|---|
| Thickness | ASTM D-374 | 0.04 | 0.041 |
| Tensile Strength (lb/in) | ASTM D-4121 | 80 min | 131 |
| Tensile Strength @ 100% Elongation | ASTM D-412 | 40 min | 73 |
| Tensile Stress @ 100% Elongation | ASTM D-412 | 300 min | 389 |
| Tear Strength (lb/in) | ASTM D-1004 | 250 min | 395 |
| Microorganism Resistance | ASTM D-4551 Annex A1 | 12 of 12 Pass | Passes |
| Puncture Resistance | ASTM D-4551 Annex A2 | 6 of 6 Pass | Passes |
| Indentation Resistance | ASTM D-4551 Annex A3 | 3 of 3 Pass | Passes |
| Folding Resistance | ASTM D-4551 Annex A4 | 3 of 3 Pass | Passes |
| Chemical Resistance | ASTM D-543 | | |
| Distilled $H_2O$ | | +1% max | 0.40% |
| Soapy $H_2O$ | | +2% max | −0.46% |
| Alkali | | 3 of 3 pass | Passes |
| Hydrostatic Pressure | ASTM D-4551 Annex A5 | 3 of 3 pass | Passes |
| Shrinkage (%) | ASTM D-1204 | | |
| Sheet Width | | 5% max | +1.52% |
| Machine Direction | | 5% max | −3.08% |
| Volatile Loss @ 158° F. (70° C.) | ASTM D-1203 | 1.5% max | 0.32% |

The padded center layer 21 is so dimensionally configured as to be of a relative thickness in a range of about ten to twenty times that of the covering layer of flexible plastic-like material 31 to provide the requisite resistance to impact. In this regard, the layers illustrated in FIGS. 2A and 2B are shown in somewhat exaggerated fashion for ease of illustration, rather than for dimensional consistency. The thickness of the layer of plastic-like material 31 in one run of the product was approximately 1 mm as compared to the thickness of the padded central layer which was approximately 13 mm. The thickness of the outer plies 19 and 23, is not particularly critical but is slightly less than that of the layer of plastic-like material.

The so arranged combination of materials provide an impact shield of a vehicle surface against adverse weather conditions such as hail and will to a large degree provide a car surface from impact in such areas as they may frequently occur, such as parking lots and public parking on streets and the like.

It is important to note that the inner central padded foam layer 21 and covering layer of plastic-like material 31 are not laminated together, but rather are given some degree of freedom of movement within the surrounding fabric cover 19, 23. This is illustrated in exaggerated fashion in FIG. 2A by the space between the layers. In other words, the surrounding fabric cover 19, 23 is shaped in the nature of a bag or envelope which holds and contains the sheets of padded foam 21 and plastic-like cover material 31. Allowing some relative movement between the inner resilient layers and the outer fabric cover facilitates rolling the vehicle cover up into a cylindrical shape for storage in a carrying bag, such as bag 55 shown in FIG. 3, allowing the cover to be stored in a more compact package. The loose nature of the construction may also affect the ultimate impact resistance of the protective cover in use.

The individual panels (25, 27 and 29 in FIG. 4) of the custom fit cover of the invention can be separated and removed from the vehicle individually by separating the Velcro™ seams 28, or by un-zipping the zipper regions, or other attachment regions which may run along the seams of the panels.

This provides several advantages including allowing replacement of damages panels as a result of contact with a severe storm or due to weathering over extended seasons. Providing the cover in replaceable panels, which may be configured with Velcro™ or zippered connecting regions, or the like, enables the consumer to quickly and easily remove a panel for replacement or repair, as may be deemed necessary and also allows the panels to be separated to facilitate rolling up the panels for storage.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

An invention has been provided with several advantages. The protective vehicle cover of the invention is simple in design and economical to manufacture, and yet provides adequate protection for hail or damage from other falling objects. The multiple ply material can be rolled up for storage in the trunk or other compartment of a vehicle when not in use. The removable panels allow the cover to be custom fit to a particular model vehicle and can be removed and replaced as needed. The panels can be provided with tie down straps or fastening elements which allow the cover to be securely installed. The use of tie down straps and Velcro™ attachment regions allow the blanket to be easily unrolled or unfolded and installed by a user, even in windy conditions.

While the invention has been shown in two of its forms, it is not thus limited and is susceptible to various changes and modifications without departing from the spirit thereof.

I claim:

1. A protective vehicle cover for protecting an exposed outer surface of a vehicle from hail and other falling objects, the cover comprising:
    a flexible blanket having a front side and a back side with a thickness therebetween, the blanket being made up of an outer fabric cover on both the front and back sides of the blanket and a protective central region, the protective central region being made up of a layer of foam cushioning material covered with a layer of flexible plastic-type vinyl material which together provide a cushioning effect to protect the outer surface of the vehicle from hail and other falling objects; and
    the back side of the blanket being positionable against the outer surface of the vehicle and substantially conforming to the shape of the vehicle, the front side of the blanket being exposed to the weather.

2. The protective vehicle cover of claim 1, wherein the layer of flexible plastic-type vinyl material is formed from PVC flexible shower pan liner material.

3. The protective vehicle cover of claim 2, further comprising a plurality of tie down straps associated with the blanket for attaching the flexible blanket to the outer surface of the vehicle.

4. The protective cover of claim 1, wherein the vehicle has a hood, a roof, a trunk and side panels, and wherein the cover is selectively sized to cover at least the hood, roof and trunk surfaces of the vehicle.

5. The protective cover of claim 4, wherein the cover is selectively sized to cover the hood, roof, trunk and side panels of the vehicle.

6. The protective vehicle cover of claim 1, wherein the outer cover of the flexible blanket is formed from a material selected from the group consisting of nylons, polyesters, vinyl plastics and polyolefins.

7. The protective vehicle cover of claim 6, wherein the outer cover of the flexible blanket is formed of a woven nylon fabric material.

8. The protective vehicle cover of claim 6, wherein the outer cover of the flexible blanket is formed of spun-bonded polypropylene.

9. The protective vehicle cover of claim 1, wherein the layer of foam cushioning material which makes up the protective central region of the blanket is made of a closed cell polyethylene foam material.

10. The protective vehicle cover of claim 1, wherein the layer of flexible plastic-type vinyl material has a thickness from about 30 to 40 mils.

11. The protective cover of claim 1, wherein the layer of foam cushioning material is about 10 to 20 times the relative thickness of the layer of flexible plastic-type vinyl material.

12. The protective vehicle cover of claim 1, wherein the flexible blanket is provided as a plurality of separate panels, each of which is custom fit to a portion of the exterior of the vehicle to be protected.

13. The protective vehicle cover of claim 12, wherein the plurality of separate panels have seam regions, the seam regions being connectable by mating hook and loop type fastening regions.

* * * * *